US008819071B2

(12) United States Patent
Jung et al.

(10) Patent No.: US 8,819,071 B2
(45) Date of Patent: Aug. 26, 2014

(54) PERSONALIZING SERVICE SYSTEM AND METHOD BASED ON ONTOLOGY

(75) Inventors: Han Min Jung, Daejeon (KR); Pyung Kim, Daejeon (KR); Seung Woo Lee, Daejeon (KR); Mi Kyung Lee, Daejeon (KR); Dong Min Seo, Cheongju-si (KR); Won Kyung Sung, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 461 days.

(21) Appl. No.: 13/153,295

(22) Filed: Jun. 3, 2011

(65) Prior Publication Data

US 2011/0320505 A1 Dec. 29, 2011

(30) Foreign Application Priority Data

Jun. 25, 2010 (KR) .................. 10-2010-0060281

(51) Int. Cl.
*G06F 17/30* (2006.01)
*G06F 7/00* (2006.01)
(52) U.S. Cl.
USPC .......................................... 707/794; 707/755
(58) Field of Classification Search
USPC ................................................... 707/794
See application file for complete search history.

(56) References Cited

U.S. PATENT DOCUMENTS

| 2004/0107155 | A1* | 6/2004 | Yanosy | 705/37 |
| 2006/0173838 | A1* | 8/2006 | Garg et al. | 707/5 |
| 2007/0081197 | A1* | 4/2007 | Omoigui | 358/403 |
| 2008/0004951 | A1 | 1/2008 | Huang et al. | |
| 2009/0083203 | A1* | 3/2009 | Cho et al. | 706/21 |
| 2009/0083367 | A1* | 3/2009 | Li et al. | 709/202 |
| 2009/0172146 | A1 | 7/2009 | Bates et al. | |
| 2010/0257131 | A1* | 10/2010 | Kim et al. | 706/47 |

FOREIGN PATENT DOCUMENTS

| KR | 10-2007-0076749 A | 7/2007 |
| KR | 10-0786342 B1 | 12/2007 |
| KR | 10-2009-0072575 A | 7/2009 |

OTHER PUBLICATIONS

Moonhee Tark et al., "Design and Implementation of a EER-based Visual Product Information Modeler" et al., Journal of the Society for e-Business Studies, Aug. 2007, vol. 12, No. 3, Korea Institute of CALS/EC, Republic of Korea.
European Search Report for European Patent Application No. 11169620.9 which corresponds to U.S. Appl. No. 13/153,295.

* cited by examiner

*Primary Examiner* — Kuen Lu
(74) *Attorney, Agent, or Firm* — LRK Patent Law Firm

(57) ABSTRACT

A personalized service system and method based on an ontology is provided, in which if a user selects a personalized service while a subject or an object in a user profile ontology of user's personal information is associated with a subject or an object of a personalized service ontology through a relationship name, the system and method searches for a personalized service ontology corresponding to the selected personalized service, acquires personal information of an instance form in the user profile ontology associated with the personalized service ontology, executes the personalized service by applying the acquired personal information, and provides the user with a result of the execution.

10 Claims, 7 Drawing Sheets

PERSONALIZING SERVICE SYSTEM AND METHOD BASED ON ONTOLOGY

CROSS REFERENCE TO RELATED APPLICATION

This application claims the benefit under 35 U.S.C.§119(a) of Korean Patent Application No. 10-2010-0060281, filed on Jun. 25, 2010, the disclosure of which is incorporated by reference in its entirety for all purposes.

BACKGROUND

1. Field

The present invention relates to a personalized service system and method based on an ontology, and more specifically, to a personalized service system and method based on an ontology, in which if a user selects a personalized service while a subject or an objet in a user profile ontology of user's personal information is associated with a subject or an object of a personalized service ontology through a relationship name, the system and method searches for a personalized service ontology corresponding to the selected personalized service, acquires personal information of an instance form in the user profile ontology associated with the personalized service ontology, executes the personalized service by applying the acquired personal information, and provides the user with a result of the execution.

2. Description of the Related Art

When a service based on available resources including certain contents is provided to a user through a network, it is generally a custom-tailored service. A personalized service such as the custom-tailored service is not a service provided based on randomly selected available resources, but a service provided using available resources selected based on subscriber's profile information. Studies on a variety of methods for providing such a personalized service are under progress, and most of the studies have a structure of configuring services based on the subscriber's profile information.

Conventional techniques related thereto construct a profile from information on a user's personal taste, capability of a terminal for displaying contents, conditions required for displaying the contents, requirements of contents manufacturers, and the like, automatically generate personalized contents generating rules by integrating the profile information according to predetermined rules, generate personalized contents based on the contents generating rules, and provide a user terminal with the personalized service.

The conventional techniques including the technique described above provide personalized services by utilizing the profile information and surrounding available resources without considering subscriber's environments varying in real-time. That is, the conventional techniques do not consider subscriber's profile information dynamically varying depending on time and space and provide the personalized services in a centralized method considering only the user profile information previously stored in the system. Accordingly, in most cases, if a subscriber provides the system with all kinds of profile information related to the subscriber, the system provides the subscriber with custom-tailored personalized services using the provided profile information by utilizing surrounding available resources related to the location of the subscriber.

However, the profile information, i.e., the basis of the personalized services, endlessly varies depending on a subscriber, and although it is the same subscriber, the profile information may vary depending on time and space of the subscriber. Therefore, it is difficult to provide the subscriber with optimally personalized services by using only the subscriber's profile information previously stored in the system, without considering the varying subscriber's profile information. Therefore, a method of further efficiently classifying and managing the subscriber's profile information is required in order to provide the optimally personalized services.

SUMMARY

Therefore, the present invention has been made in view of the above problems, and it is an object of the present invention to provide a personalized service system and method based on an ontology, in which if a user selects a personalized service while a subject or an object in a user profile ontology of user's personal information is associated with a subject or an object of a personalized service ontology through a relationship name, the system and method searches for a personalized service ontology corresponding to the selected personalized service, acquires personal information of an instance form in the user profile ontology associated with the personalized service ontology, executes the personalized service by applying the acquired personal information, and provides the user with a result of the execution.

To accomplish the above object, according to one aspect of the present invention, there is provided a personalized service method comprising the steps of: (a) storing user's personal information in a user profile ontology in the form of an instance; (b) storing a service to be associated with the user profile ontology in a personalized service ontology; and (c) associating a subject or an object in the user profile ontology with a subject or an object in the personalized service ontology through a relationship name.

In step (a), the personal information includes static information, such as a name, a sex, a date of birth, a place of residence, an age, an organization belonging to, and the like, and dynamic information such as a current position, a current time, and the like.

In step (b), the personalized service is provided using the personal information as an input parameter.

According to another aspect of the present invention, there is provided a personalized service method of a system in which user's personal information is stored in a user profile ontology and a personalized service ontology is associated with the user profile ontology, the method comprising the steps of: (a) receiving a personalized service selected from a user; (b) searching for the personalized service ontology corresponding to the selected personalized service and acquiring personal information of an instance form in the user profile ontology associated with the personalized service ontology; and (c) executing the personalized service by applying the acquired personal information and providing the user with a result of the execution.

In addition, in step (c), execution options of the personalized service are provided to the user in the form of a list so that the user may select options, and the personalized service is executed by applying personal information corresponding to the selected options, and then a result of the execution is provided to the user.

In addition, the personal information includes static information, such as a name, a sex, a date of birth, a place of residence, an age, an organization belonging to, and the like, and dynamic information such as a current position, a current time, and the like.

In addition, the personalized service is provided using the personal information as an input parameter.

According to another aspect of the present invention, there is provided a personalized service system comprising: a user information storage unit for storing user's personal information in a user profile ontology in the form of an instance; a service information storage unit for storing a service to be associated with the user profile ontology in a personalized service ontology; and a personalized service association unit for associating a subject or an object in the service profile ontology with a subject or an object of the personalized service ontology through a relationship name.

In addition, the personal information includes static information, such as a name, a sex, a date of birth, a place of residence, an age, an organization belonging to, and the like, and dynamic information such as a current position, a current time, and the like.

In addition, the service information storage unit stores the personalized service ontology associated with the personal information in order to use the personal information as an input parameter.

According to another aspect of the present invention, there is provided a personalized service system comprising: a user information storage unit for storing user's personal information in a user profile ontology in the form of a first subject, a first object, and a first relationship name; a service information storage unit for storing a personalized service in a personalized service ontology in the form of a second subject, a second object, and a second relationship name, wherein the second subject or the second object of the personalized service ontology is stored to be associated with the first subject or the first object of the user profile ontology through another relationship name; and a personalized service execution unit for, if the user selects a personalized service, searching for a personalized service ontology corresponding to the selected personalized service, acquiring personal information of an instance form in the user profile ontology associated with the personalized service ontology, executing the personalized service by applying the acquired personal information, and providing the user with a result of the execution.

In addition, the personal information includes static information, such as a name, a sex, a date of birth, a place of residence, an age, an organization belonging to, and the like, and dynamic information such as a current position, a current time, and the like.

In addition, the personalized service is provided using the personal information as an input parameter.

In addition, the personalized service execution unit provides the user with execution options of the personalized service in the form of a list, receives options selected by the user, executes the personalized service by applying personal information corresponding to the selected options, and provides the user with a result of the execution.

DETAILED DESCRIPTION

Details of the objects, technical configurations, and operational effects of the present invention described above will be further clearly understood hereinafter according to the detailed descriptions with reference to the drawings accompanied in the specification of the present invention. The preferred embodiments of the present invention will be hereafter described in detail, with reference to the accompanying drawings.

Figure 1:
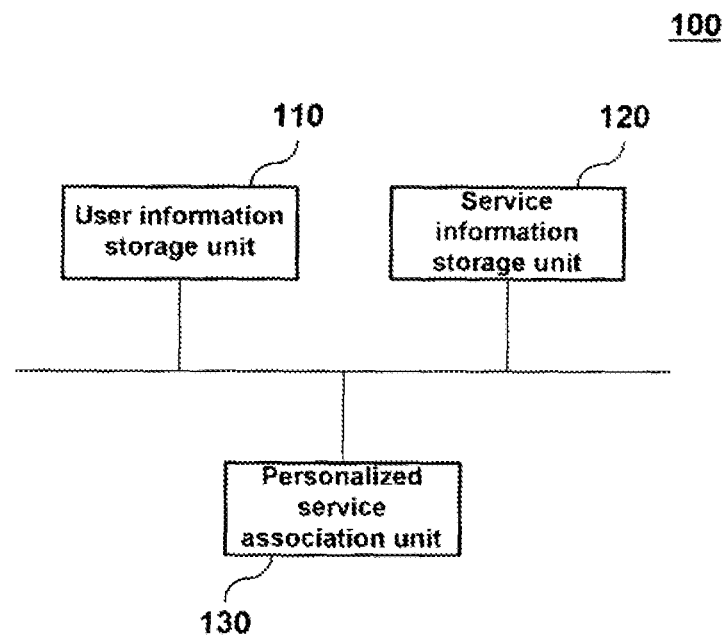
FIG. 1 is a functional block diagram showing the configuration of a personalized service system according to an embodiment of the present invention.

FIG. 1 is a functional block diagram showing the configuration of a personalized service system according to an embodiment of the present invention.

Referring to FIG. 1, a personalized service system 100 according to the present invention includes a user information storage unit 110, a service information storage unit 120, and a personalized service association unit 130.

In addition, although it is not shown in the figure, the personalized service system may include an input unit for receiving data or the like from a user when the personalized service system 100 is applied to a personal terminal or the like, and a display unit for displaying a result of associating a user profile ontology with a personalized service ontology for personalized services on a screen.

The user information storage unit 110 stores user's personal information in the user profile ontology in the form of an instance. That is, the user's personal information is stored in the user profile ontology in the form of a first subject, a first object, and a first relationship name.

Here, the personal information includes static information, such as a name, a sex, a date of birth, a place of residence, an age, an organization belonging to, and the like, and dynamic information such as a current position, a current time, and the like.

The service information storage unit 120 stores a service to be associated with the user profile ontology in the personalized service ontology. That is, the service information storage unit 120 stores a personal service using the personal information in the personalized service ontology in the form of a second subject, a second object, and a second relationship name. For example, a weather service, a biorhythm service and the like provided using personal information as an input parameter are stored in the personalized service ontology.

The personalized service association unit 130 associates a subject or an object in the user profile ontology with a subject or an object in the personalized service ontology through a relationship name. That is, the first subject is associated with the second object through a third relationship name, or the second subject is associated with the first object through the third relationship name.

Figure 2:
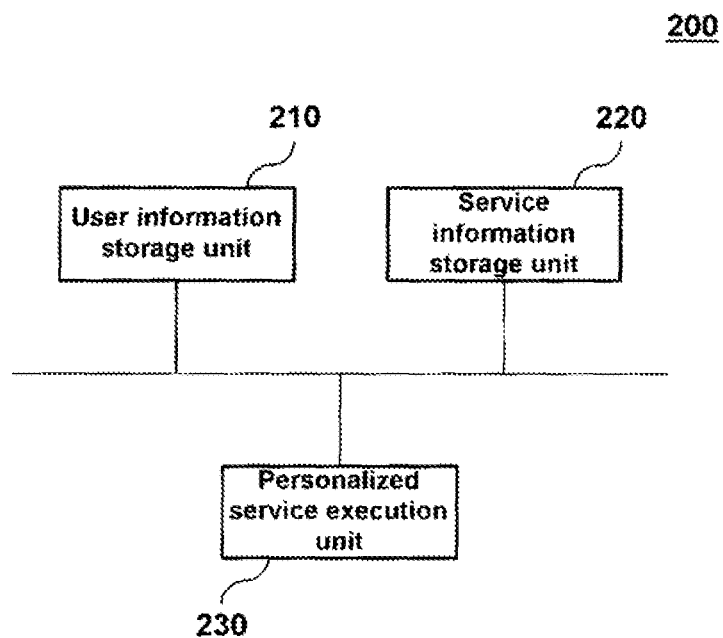
FIG. 2 is a functional block diagram schematically showing the configuration of a personalized service system according to another embodiment of the present invention.

FIG. 2 is a functional block diagram schematically showing the configuration of a personalized service system according to another embodiment of the present invention.

Referring to FIG. 2, a personalized service system 200 according to the present invention includes a user information storage unit 210, a service information storage unit 220, and a personalized service execution unit 230.

In addition, although it is not shown in the figure, the personalized service system may include an input unit for receiving data or the like from a user when the personalized service system 200 is applied to a personal terminal or the like, and a display unit for displaying a result of executing the personalized service on a screen.

The user information storage unit 210 stores user's personal information in a user profile ontology in the form of a first subject, a first object, and a first relationship name.

The service information storage unit 220 stores a personalized service in a personalized service ontology in the form of a second subject, a second object, and a second relationship name, and the second subject or the second object of the personalized service ontology is associated with the first subject or the first object of the user profile ontology through another relationship name.

If a user selects a personalized service, the personalized service execution unit 230 searches for a personalized service ontology corresponding to the selected personalized service, acquires personal information of an instance form in the user profile ontology associated with the personalized service ontology, executes the personalized service by applying the acquired personal information, and provides the user with a result of the execution.

Here, the personal information includes static information, such as a name, a sex, a date of birth, a place of residence, an age, an organization belonging to, and the like, and dynamic information such as a current position, a current time, and the like.

In addition, the personalized service includes services provided using the personal information as an input parameter, such as a weather service, a biorhythm service and the like.

The personalized service execution unit 230 provides the user with execution options of the personalized service in the form of a list, receives one or more execution options selected by the user, executes the personalized service by applying personal information corresponding to the execution options selected by the user, and provides the user with a result of the execution.

Figure 3:
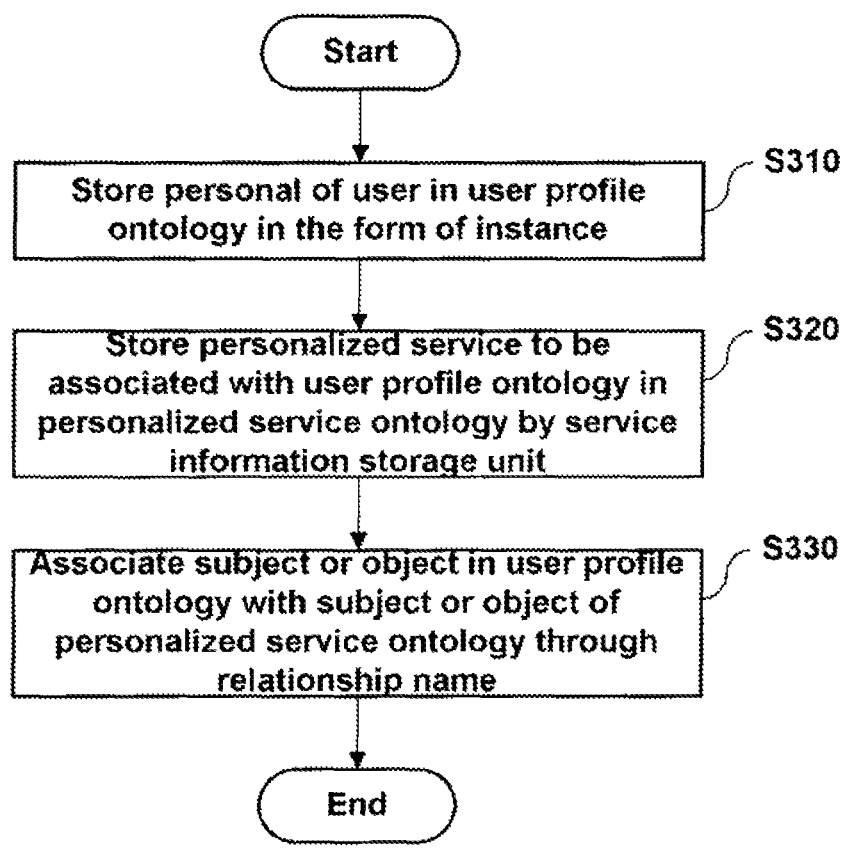
FIG. 3 is a flowchart illustrating a personalized service method according to an embodiment of the present invention.

FIG. 3 is a flowchart illustrating a personalized service method according to an embodiment of the present invention.

Figure 4:
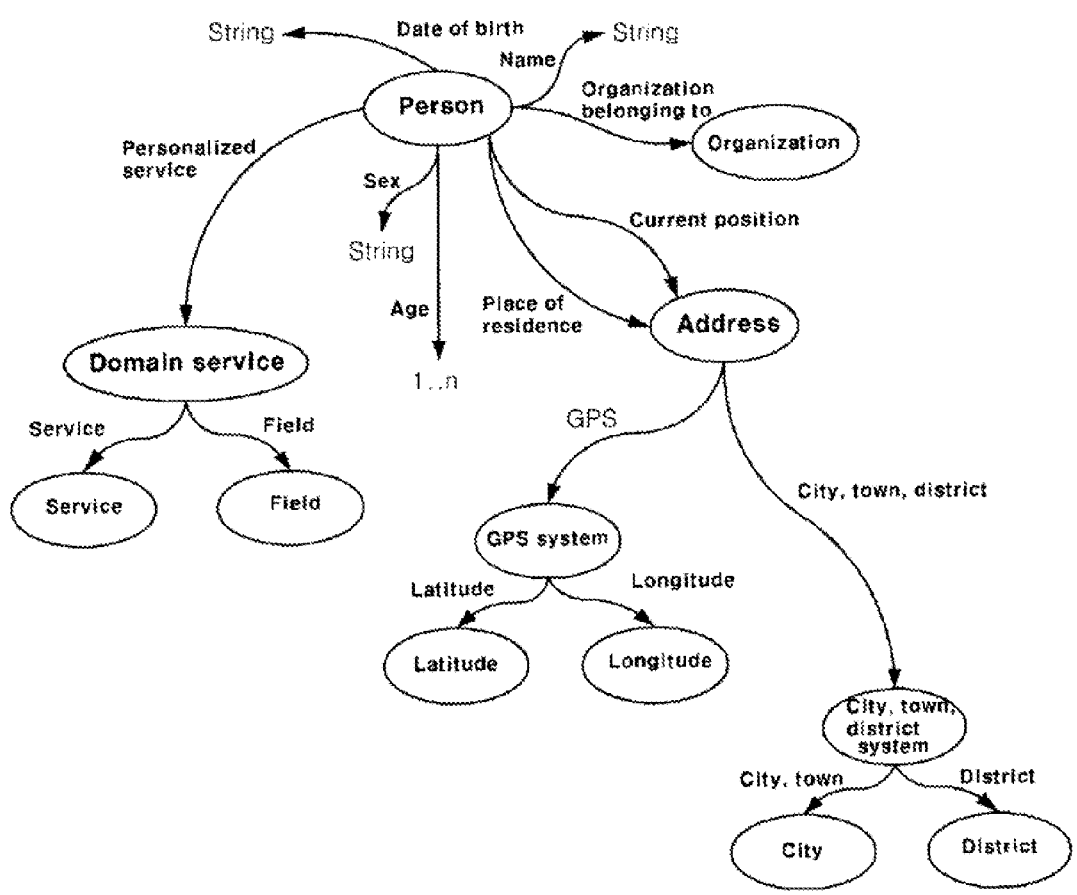
FIG. 4 is a view showing an ontology schema associating a user profile ontology with a personalized service ontology according to an embodiment of the present invention.

Referring to FIG. 3, the personalized service system 100 according to the present invention stores user's personal information in the user profile ontology in the form of an instance as shown in FIG. 4 S310.

At this point, the personal information includes static information, such as a name, a sex, a date of birth, a place of residence, an age, an organization belonging to, and the like, and dynamic information such as a current position, a current time, and the like.

Here, FIG. 4 is a view showing an ontology schema associating a user profile ontology with a personalized service ontology according to an embodiment of the present invention.

Subsequently, the personalized service system 100 stores a personalized service to be associated with the user profile ontology in the personalized service ontology as shown in FIG. 4 S320.

At this point, the personalized service includes services provided using the personal information as an input parameter, such as a weather service, a biorhythm service and the like. That is, the service information storage unit 220 stores the personalized service ontology associated with the personal information in order to use the personal information as the input parameter.

Subsequently, as shown in FIG. 4, the personalized service system 100 associates a subject or an object in the user profile ontology with a subject or an object of the personalized service ontology through a relationship name S330.

Figure 5:
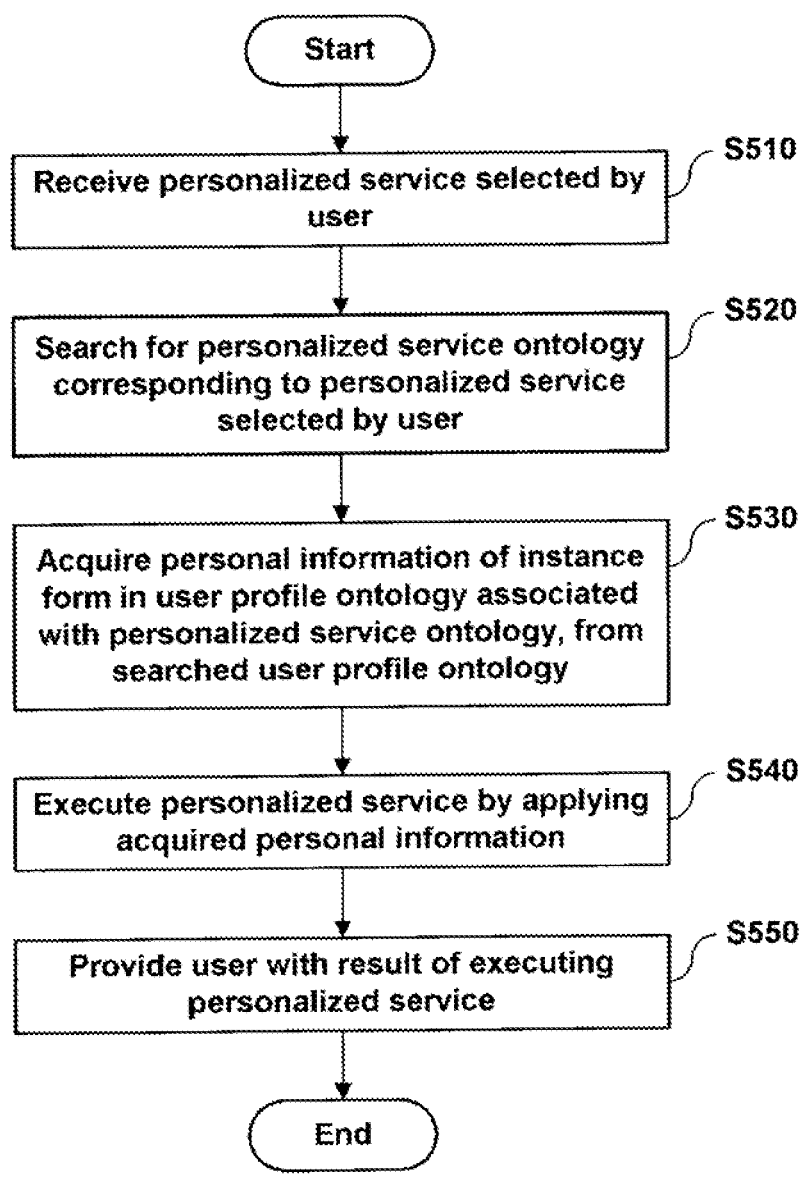
FIG. 5 is a flowchart illustrating a personalized service method according to another embodiment of the present invention.

FIG. 5 is a flowchart illustrating a personalized service method according to another embodiment of the present invention.

Referring to FIG. 5, a personalized service system 200 according to another embodiment of the present invention stores user's personal information in the user profile ontology, and the user selects a personalized service while the personalized service ontology is associated with the user profile ontology S510.

At this point, the personal information includes static information, such as a name, a sex, a date of birth, a place of residence, an age, an organization belonging to, and the like, and dynamic information such as a current position, a current time, and the like. In addition, the personalized service includes services provided using the personal information as an input parameter, such as a weather service, a biorhythm service and the like.

Here, the personalized service system 200 provides the user with execution options of the personalized service, and the user selects one or more of the execution options.

Subsequently, the personalized service system 200 searches for a personalized service ontology corresponding to the personalized service selected by the user S520, and acquires personal information of an instance form in the user profile ontology associated with the personalized service ontology, from the searched user profile ontology S530.

In addition, the personalized service system 200 may acquire personal information corresponding to the execution options selected by the user.

Subsequently, the personalized service system 200 executes the personal service by applying the acquired personal information S540 and provides the user with a result of executing the personalized service S550.

In addition, the personalized service system 200 may execute the personalized service by applying the personal information corresponding to the execution options selected by the user and provide the user with a result of the execution.

Figure 6:
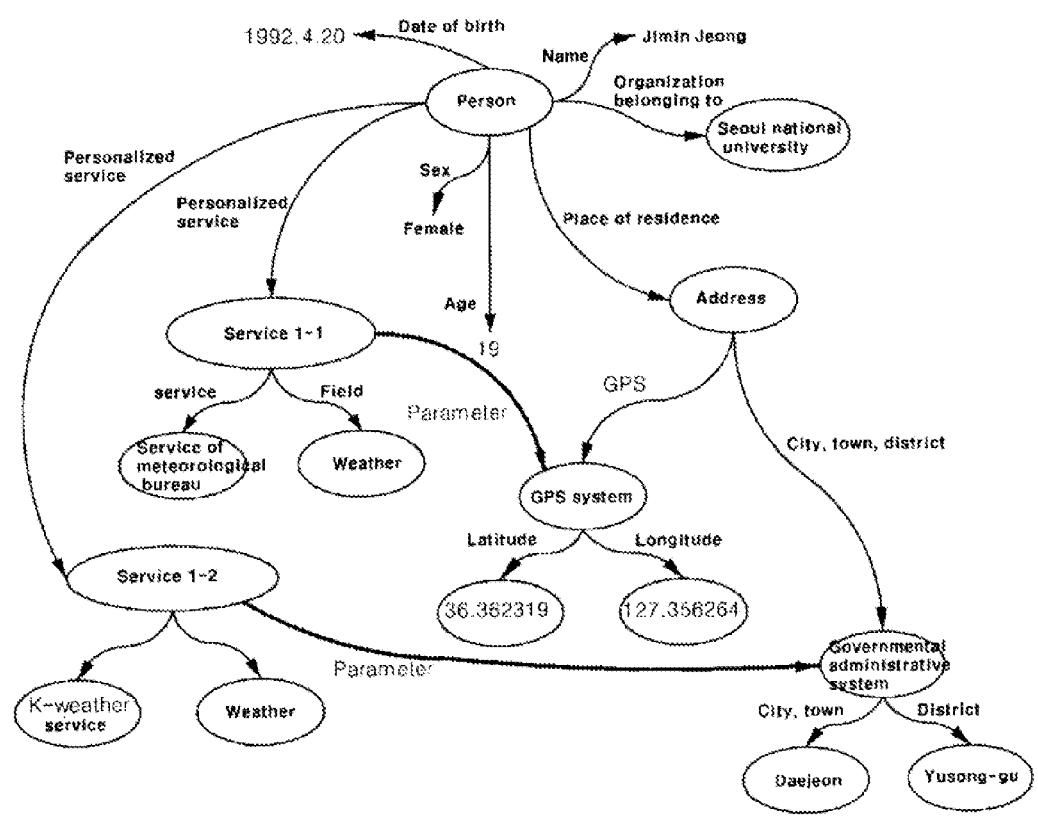
FIG. 6 is a view showing ontology instances associating information on a place of residence with a weather service according to an embodiment of the present invention.

For example, if the user selects a weather service, as shown in FIG. 6, the personalized service system 200 searches a GPS system and a governmental administrative system (city, town, and district) using a residential address as personal information matching to the weather service through an ontology, and provides a result in the form of a list. If the user selects the GPS system, the user can be provided with a weather service corresponding to the latitude and longitude according to the GPS system. Here, FIG. 6 is a view showing ontology instances associating information on a place of residence with a weather service according to an embodiment of the present invention.

Figure 7:
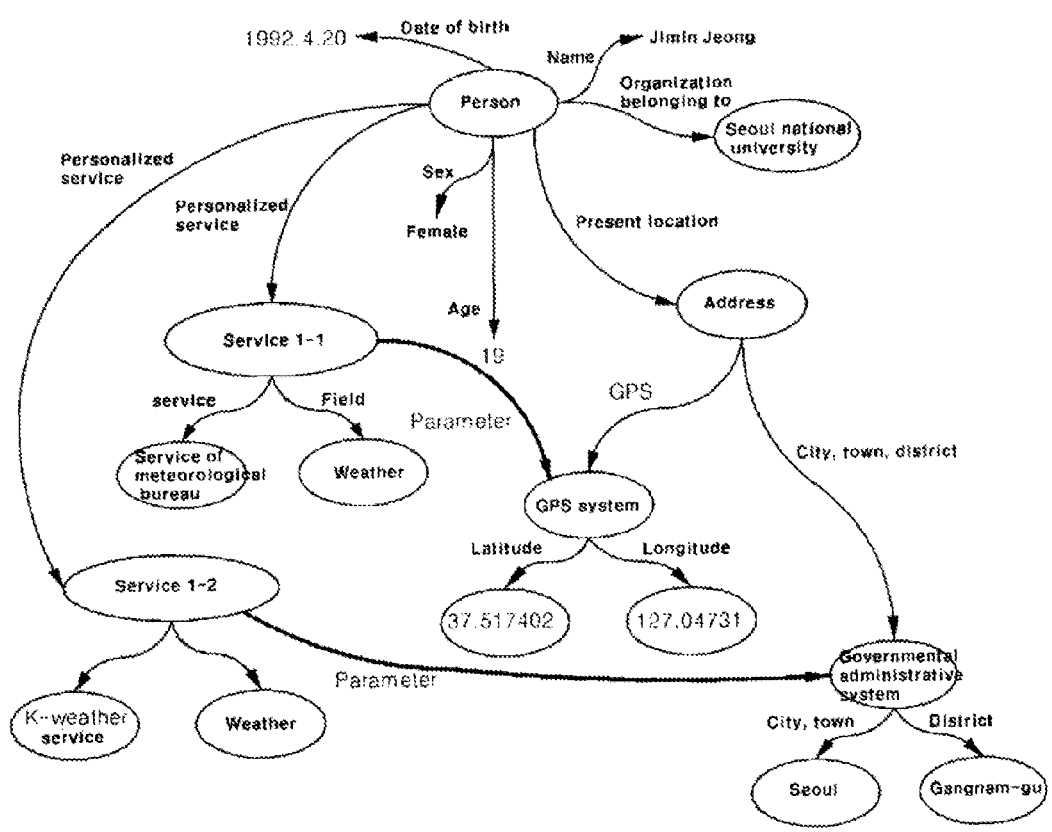
FIG. 7 is a view showing ontology instances associating a current position with a weather service according to an embodiment of the present invention.

In addition, if the user selects a weather service, as shown in FIG. 7, the personalized service system 200 searches a GPS system and a governmental administrative system (city, town, an district) using an address of the current position as personal information matching to the weather, service through an ontology, and provides a result in the form of a list. If the user selects the governmental administrative system, the user can be provided with a weather service corresponding to a city or a district according to the selected governmental administrative system. Here, FIG. 7 is a view showing ontology instances associating a current position with a weather service according to an embodiment of the present invention.

Figure 8:
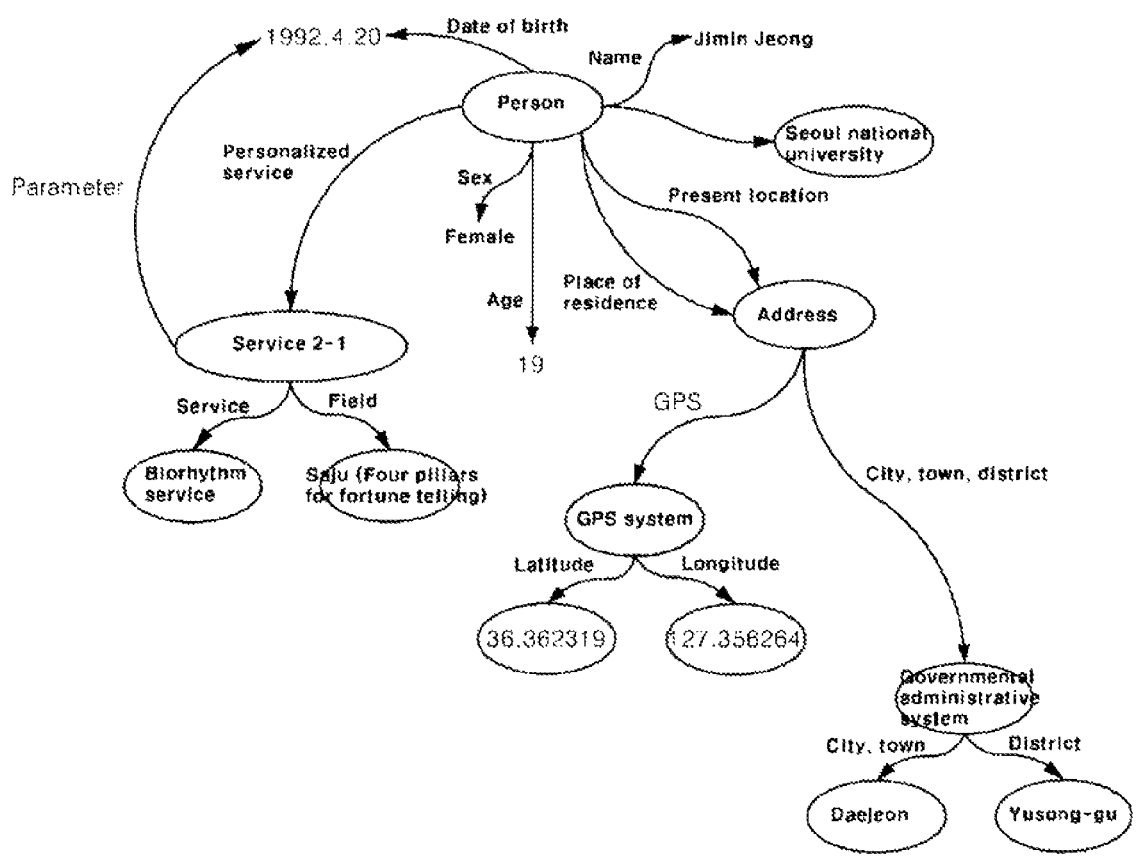
FIG. 8 is a view showing ontology instances associating a date of birth with a biorhythm service according to an embodiment of the present invention.

In addition, if the user selects a biorhythm service, as shown in FIG. 8, the personalized service system 200 searches for a date of birth as personal information matching to the biorhythm service through an ontology, and provides the user with a biorhythm service corresponding to the searched date of birth. Here, FIG. 8 is a view showing ontology instances associating a date of birth with a biorhythm service according to an embodiment of the present invention.

As described above, in the case of a personalized service according to the present invention, a variety of different services are connected to the user profile ontology, and thus a plenty of personalized services can be provided.

According to the present invention described above, if a user selects a personalized service while a subject or an object in the user profile ontology of user's personal information is associated with a subject or an object of the personalized service ontology through a relationship name, a personalized service system and method based on an ontology can be implemented to search for a personalized service ontology corresponding to the selected personalized service, acquire personal information of an instance form in the user profile ontology associated with the personalized service ontology, execute the personalized service by applying the acquired personal information, and provide the user with a result of the execution.

According to the present invention, personal agent services can be called and executed whenever and wherever for a specific user, and accordingly, custom-tailored works can be performed in a ubiquitous environment.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A personalized service method of a system comprising a user profile ontology in which a first subject is associated with a first object through a first relationship name and a personalized service ontology in which a second subject is associated with a second object through a second relationship name, the method comprising:
   (a) if a user inputs personal information, storing the personal information in the user profile ontology as one of ontology data structures including the first subject, the first object, and the first relationship name;
   (b) storing a personalized service using the personal information in the personalized service ontology as one of ontology data structures including the second subject, the second object, and the second relationship name;
   (c) associating the first subject with the second object through a third relationship name or associating the second subject with the first object through the third relationship name, wherein the third relationship name is a way in which the personalized service uses the personal information associated therewith;
   (d) selecting a certain personalized service by the user;
   (e) acquiring the personal information in the personalized service ontology associated with the selected personalized service through the third relationship name; and
   (f) executing the selected personalized service using the acquired personal information.

2. The method according to claim 1, wherein in step (a), the personal information includes static information.

3. The method according to claim 2,
   wherein the static information includes at least one member of the group consisting of a name, a sex, a date of birth, a place of residence, an age, and an organization belonging to, and
   wherein the dynamic information includes at least one member of the group consisting of a current position, and a current time.

4. The method according to claim 1, wherein in step (f), the selected personalized service is executed using the personal information as an input parameter.

5. The method according to claim 1, wherein in step (f), execution options of the selected personalized service is provided to the user in the form of a list so that the user may select options, and a personalized service corresponding to the selected options is executed.

6. A personalized service system comprising:
   a user information storage unit that stores user's personal information in a user profile ontology in a form of ontology data structures including a first subject, a first object, and a first relationship name;
   a service information storage unit that stores a personalized service using the personal information in a personalized service ontology in a form of ontology data structures including a second subject, a second object, and a second relationship name;
   a personalized service association unit that associates the first subject with the second object through a third relationship name, or associating the second subject with the first object through the third relationship name, wherein the third relationship name is a way in which the personalized service uses the personal information associated therewith; and
   a personalized service execution unit, if the user selects a certain personalized service, that acquires the personal information in the personalized service ontology associated with the selected personalized service through the third relationship name and executes the selected personalized service using the acquired personal information.

7. The system according to claim 6, wherein the personal information includes static information.

8. The system according to claim 7,
   wherein the static information includes at least one member of the group consisting of a name, a sex, a date of birth, a place of residence, an age, and an organization belonging to, and
   wherein the dynamic information includes at least one member of the group consisting of a current position, and a current time.

9. The system according to claim 6, wherein the personalized service execution unit executes the selected personalized service using the personal information as an input parameter.

10. The system according to claim 6, wherein the personalized service execution unit provides the user with execution options of the selected personalized service in the form of a list so that the user may select options and executes a personalized service corresponding to the selected options.

* * * * *